United States Patent [19]

Lehner et al.

[11] Patent Number: 4,895,764
[45] Date of Patent: Jan. 23, 1990

[54] MAGNETIC RECORDING MEDIA

[75] Inventors: August Lehner, Roedersheim-Gronau; Albert Kohl, Laumersheim; Michael Bobrich, Boehl-Iggelheim; Hermann Roller, Ludwigshafen; Peter Richter, Frankenthal; Werner Lenz, Bad Durkheim; Ludwig Kreitner, Heppenheim; Peter Rudolf, Maxdorf, all of Fed. Rep. of Germany

[73] Assignee: BASF Aktiengesellschaft, Ludwigshafen, Fed. Rep. of Germany

[21] Appl. No.: 161,048

[22] Filed: Feb. 26, 1988

[30] Foreign Application Priority Data

Mar. 7, 1987 [DE] Fed. Rep. of Germany ....... 3707440

[51] Int. Cl.$^4$ ................................................. G11B 5/70
[52] U.S. Cl. ................................ 428/425.9; 428/694; 428/900
[58] Field of Search ....................... 428/425.9, 694, 900

[56] References Cited

U.S. PATENT DOCUMENTS

| 2,871,218 | 1/1959 | Schollenberger . |
| 2,899,411 | 8/1959 | Schollenberger . |
| 3,320,090 | 5/1967 | Graubart . |
| 3,437,510 | 4/1969 | Diaz . |
| 3,650,828 | 3/1972 | Higashi et al. . |
| 4,477,531 | 10/1984 | Kohler et al. . |
| 4,567,108 | 1/1986 | Lehner et al. ..................... 428/425.9 |
| 4,568,610 | 2/1986 | Lehner et al. ..................... 428/425.9 |
| 4,568,612 | 2/1986 | Lehner et al. ..................... 428/425.9 |
| 4,597,990 | 7/1986 | Roller et al. ...................... 428/425.9 |
| 4,666,781 | 5/1987 | Lehner et al. ..................... 428/425.9 |
| 4,666,783 | 5/1987 | Heil et al. ......................... 428/425.9 |
| 4,677,030 | 6/1987 | Gerum et al. ..................... 428/425.9 |

FOREIGN PATENT DOCUMENTS 1282700 4/1987 Fed. Rep. of Germany .

Primary Examiner—Paul J. Thibodeau
Attorney, Agent, or Firm—Keil & Weinkauf

[57] ABSTRACT

In magnetic recording media consisting of a nonmagnetic base and, firmly applied to this, one or more magnetic layers based on a magnetic material finely dispersed in organic binders, the binder consists of not less than 50% by weight of a high molecular weight branched polyurethane elastomer possessing OH-containing urea groups at the chain ends.

6 Claims, No Drawings

MAGNETIC RECORDING MEDIA

The present invention relates to magnetic recording media consisting of a nonmagnetic base and, firmly applied to this, one or more magnetic layers based on a magnetic material finely distributed in an organic binder, the binder consisting of not less than 50% by weight of a high molecular weight, branched polyurethane elastomer having OH-containing urea groups at the chain ends.

Magnetic layers which are used in modern audio and video recording and playback apparatuses have to meet many different requirements. In addition to the high requirements with regard to the recording and playback properties of audio tapes, video tapes and computer tapes, which are constantly being improved, in particular the mechanical properties of the recording media have to be constantly adapted and improved (in order to benefit from the abovementioned improvements). The magnetic layers must be very flexible and have high resilience and high tensile strength. Furthermore, in order to avoid drops in output level, it is becoming increasingly necessary to reduce the coefficient of friction and increase the abrasion resistance and resistance to wear.

However, the improvements in these different properties affect one another, in some cases even counterproductively. Thus, it is desirable, inter alia, for the magnetic material in the magnetic layer to occupy a very large part of the volume, ie. to be very tightly packed. Although it is known that magnetic layers can be produced virtually completely from magnetic material, for example by plating or vapor deposition of magnetizable metals, such storage layers still give rise to a number of serious, predominantly mechanical problems. Attempts are therefore still being made to achieve a higher packing density of a magnetic material in the layer by reducing the binder content, and also to achieve an improved signal/noise ratio by the use of more and more finely divided magnetic materials having a pronounced acicular shape. However, both measures have an adverse effect on the mechanical stability of the magnetic layer and on the adhesion of the layer to the base, in particular at high temperature and humidity.

The bases used for magnetic recording media are predominantly polyethylene terephthalate films. During production, these films are oriented and crystallized, so that they have excellent properties, in particular mechanical strength, but are also substantially resistant to organic solvents. However, the good solvent resistance leads to poor adhesion of the magnetic layer.

The magnetic layer obtained by dispersing magnetic particles in a binder to prepare a coating material and by applying the latter to a base has good mechanical strength only if the adhesion is sufficient. Hence, a magnetic layer which does not have sufficient adhesion to a base may be destroyed or detached from the base film even by the use of a small force. It is extremely difficult to obtain a magnetic layer which adheres well to a base even at high humidity and temperature. A feasible but expensive solution frequently employed comprises applying an adhesion-promoting layer to the base before applying the magnetic layer. The compositions of such adhesion-promoting layers have frequently been described, but they constitute an additional expense in terms of material, machines and work. Another disadvantage is that both the particular work step and the intermediate layer itself give rise to sources of error, and the number of errors, which is critical for high quality recording media, may increase. Attempts are therefore being made to find economical and simple processes which permit the preparation of defect-free magnetic layers without adhesion promoters and having excellent mechanical properties, the said magnetic layers exhibiting good adhesion particularly under difficult climatic conditions.

The properties required for use can be obtained only by using binder combinations having excellent mechanical characteristics. It is important that the binders provide powerful adhesion to the pigment surface and to the base film even at high pigment concentrations. It is known that magnetic layers which are subjected to high mechanical loads advantageously contain polyurethane elastomers as binders. Polyesterurethanes as described in DE-B 1 106 959, DE-B 2 753 694, EP-A 0 069 955 or U.S.-A No. 2 899 411 have proven particularly useful. However, these polyurethanes often have disadvantages when used as the sole binder. In many cases, pigment wetting and pigment dispersing are adversely affected, so that any sintered materials produced in the milling process are not adequately divided up, or agglomeration of the pigment particles is not sufficiently prevented, resulting in poor alignability and hence lower packing densities. Another disadvantage of the stated polyurethanes is that the necessary resilience is frequently accompanied by insufficient hardness and a tendency to surface tack. In the prior art, therefore, appropriate polyurethanes are combined with other binders. For example, DE-B 1 269 661 describes a blend of polyurethanes with polyesters. In practice, however, the stated disadvantages are not adequately avoided. Other proposed binder combinations, for example blends of polyurethanes with phenoxy resins according to DE-B 1 295 011, with vinylidene chloride/acrylonitrile copolymers according to DE-B 2 037 605, or with polycarbonates according to DE-A 2 114 611, combinations of polyurethane resins with vinyl chloride/vinyl acetate copolymers according to DE-B 1 282 700, or combinations of polyurethane elastomers with copolymers of vinyl chloride and acrylates, as described in, for example, DE-A 2 255 802 or DE-A 2 234 822, have good pigment dispersibility and give layers having a good packing density.

We have found that the high molecular weight polyurethane elastomers described, some of which have also proven useful, no longer meet the increasing quality requirements with regard to layer adhesion when used as binders or in a binder combination, if both temperature and humidity are increased, for example to 30°-60° C. at 80-100% relative humidity (tropical climate). It is an object of the present invention to use simple measures to provide high molecular weight polyurethane elastomers which have the necessary mechanical properties, such as high abrasion resistance, elongation and tensile strength, and the use of which improves adhesion under tropical conditions.

We have found that this object is achieved, and that magnetic recording media consisting of a nonmagnetic base and, firmly applied to this, at least one magnetic layer based on a magnetic material finely distributed in a binder consisting of not less than 50% by weight of a thermoplastic polyurethane have the required properties if the thermoplastic polyurethane used is a branched polyurethane which is soluble in tetrahydrofuran and free of isocyanate groups, possesses OH-containing urea groups at the chain ends and has a molecular weight of from 40,000 to 200,000, and which is prepared from A. 1 mole of a polydiol having a molecular weight of from 400 to 4,000,
B. from 0.3 to 10 moles of a straight-chain aliphatic diol of 2 to 10 carbon atoms,
C. from 0.05 to 0.5 mole of a tri- or polyol of 3 to 10 carbon atoms,
D. from 1.3 to 13 moles of a diisocyanate of 6 to 30 carbon atoms and
E. from 0.09 to 2 moles of an aminoalcohol of 2 to 16 carbon atoms, with the proviso that the ratio of the OH groups of components A to C to the NCO groups of component D to the amine groups of component E is 1:1.03–1.3:0.03–0.3.

The branched polyurethane used in the novel recording media accordingly has from 4 to 30, in particular from 6 to 24, preferably from 8 to 24, OH groups per molecule, which are bonded to the chain ends via urea groups. A weight average molecular weight of from 40,000 to not more than 200,000 is necessary to achieve the required mechanical properties. Molecular weights of from 50,000 to 150,000, in particular from 60,000 to 110,000, are preferred. However, an OH number greater than 30 is disadvantageous in the case of high molecular weights since excessively high OH numbers mean that the molecules are too highly branched, with the result that preparation and use become more difficult since excessive branching leads to molecular coils and to partially crosslinked polymers. From 1 to 15, in particular from 2 to 10, branches with a theoretical mean chain length of more than 10,000 lead to the desired polyurethane elastomers.

The polyurethanes having this structure generally have a hardness, in the uncrosslinked state, of from 18 to 110 s, according to DIN 53,157. Furthermore, they have a modulus of elasticity (according to DIN 53,457) of from 20 to 400N/mm$^2$, an elongation at break of from 150 to 1,250% (DIN 53,455) and a tensile strength of from 50 to 95N/mm$^2$ (DIN 53,455). The softening point is from 80° to 180° C. Particularly advantageously, the pendulum hardness (DIN 53,157) is from 18 to 45 s, the modulus of elasticity is from 30 to 100N/mm$^2$, the elongation at break is from 300 to 1,000% and the tensile strength is from 55 to 90N/mm$^2$, with a softening point of from 100° to 160° C.

A further improvement in the novel recording media can be achieved if a polyisocyanate is added to the dispersion, essentially consisting of the magnetic material and the special polyurethane, before application to the base. Crosslinking can be effected using a large number of organic di-, tri- or polyisocyanates or isocyanate prepolymers having a molecular weight of up to 10,000, preferably from 500 to 3,000. Polyisocyanates and isocyanate prepolymers which carry more than 2 NCO groups per molecule are preferred. Polyisocyanates based on toluylene diisocyanate, hexamethylene diisocyanate or isophorone diisocyanate, which are formed by a polyaddition reaction with di- and triols or by biuret and isocyanurate formation, have proven particularly suitable. An adduct of toluylene diisocyanate with trimethylolpropane and diethylene glycol is particularly advantageous.

By admixing the abovementioned isocyanates, preferably with the ready-prepared magnetic dispersion before application to the base, the adhesive properties after storage in a conditioned chamber are again very substantially improved; furthermore the mechanical properties of the novel recording media, ie. the abrasion resistance, can also be very substantially improved and the thermoplasticity of the magnetic layer reduced. The amount of polyisocyanates to be added for this purpose is in general about 1–20, preferably 4–15, % by weight, based on the total amount of the binder.

A polyesterol, polyetherol or polycarbonate having a molecular weight of from 400 to 4,000, preferably from 700 to 2,500, is used as component A (polydiol). The polydiols are advantageously predominantly linear polymers having two terminal OH groups. The acid number of the polydiols is less than 10 and preferably less than 3. The polyesterols can be prepared in a simple manner by esterifying aliphatic or aromatic dicarboxylic acids of 4 to 15, preferably 4 to 8, carbon atoms with aliphatic or cycloaliphatic glycols, preferably of 2 to 20 carbon atoms, or by polymerization of lactones of 3 to 10 carbon atoms. Examples of suitable dicarboxylic acids are glutaric acid, pimelic acid, suberic acid, sebacic acid, dodecanedioic acid, terephthalic acid and isophthalic acid, preferably adipic acid, succinic acid and terephthalic acid. The dicarboxylic acids can be used individually or as a mixture. To prepare the polyesterols, it may be advantageous, instead of the dicarboxylic acids, to use the corresponding acid derivatives, such as carboxylic anhydrides or carbonyl chlorides. Examples of suitable glycols are diethylene glycol, pentanediol, decane-1-10-diol and 2,2,4-trimethylpentane-1,5-diol. Ethane-1,2-diol, butane-1,4-diol, hexane-1,6-diol, 2,2-dimethylpropane-1,3-diol, 1,4-dimethylolcyclohexane, 1,4-diethanolcyclohexane and 1,4-diethanolpropane are preferably used. Depending on the desired properties of the polyurethanes, the polyols can be used alone or as a mixture in various properties. Examples of suitable lactones for the preparation of the polyesterols are α,α-dimethylβ-propiolactone, butyrolactone and preferably caprolactone. Polyetherols are, for example, polytetrahydrofuran and polypropyleneoxidediol; the polycarbonates are generally based on hexane-1,6-diol.

Components B used are straight-chain aliphatic diols of 2 to 10 carbon atoms, for example ethane-1,2-diol, propane-1,3-diol, butane-1,4-diol, hexane-1,6-diol, pentane-1,5-diol, decane-1,10-diol, 2-methylpropane-1,3-diol, 2-methyl-2-butylpropane-1,3-diol, 2,2-dimethylbutane1,4-diol, 2-methyl-2-butylpropane-1,3-diol, neopentyl glycol hydroxypicalate, diethylene glycol, triethylene glycol, methyldiethanolamine, 1,4-dimethylolcyclohexane and 1,4-diethanolcyclohexane. The diols can be used individually or as a mixture.

Triols (component C) used are compounds of 3 to 10, preferably 3 to 6, carbon atoms. Examples of appropriate triols are glycerol and trimethylolpropane. Low molecular weight reaction products of, for example, trimethylolpropane with ethylene oxide and/or propylene oxide are also suitable. The presence of triols during the polyaddition reaction leads to branching of the end product, which has a positive effect on the mechanical properties of the polyurethane, provided that no local crosslinking takes place.

The polyols (component C) used can be, for example, erythritol, pentaerythritol and sorbitol.

To form the NCO-containing intermediates, the components stated under A, B and C are reacted with aliphatic, cycloaliphatic or aromatic diisocyanates of 6 to 30 carbon atoms (component D). For example, compounds such as toluylene 2,4-diisocyanate, toluylene 2,6-diisocyanate, m-phenylene diisocyanate, 4-chloro- 1,3-phenylene diisocyanate, 1,5-naphthylene diisocyanate, 1,6-hexamethylene diisocyanate, 1,4-cyclohexylene diisocyanate, 1,5-tetrahydronaphthylene diisocyanate, diphenylmethane diisocyanate, dicyclohexylmethane diisocyanate and isophorone diisocyanate are suitable for this purpose.

To form the OH-containing polyurethaneurea elastomers, the NCO-containing intermediate of A to D is reacted with aminoalcohols (components E). These aminoalcohols of 2 to 16, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)aniline. Diolamines are particularly suitable since they undergo addition at the chain end and thus double the OH number of the polymers. Diethanolamine and diisopropanoldiamine have proven particularly advantageous.

The ratio of components A to D can be varied from 1.35 to 13 moles of diisocyanate per mole of polydiol where from 0.3 to 10 moles of the diol of 2 to 20 carbon atoms and from 0.05 to 0.5 mole of triol are used, the amount of the diol used depending to some extent on the molecular weight of the polydiol employed. For practical reasons, however, it is advantageous to use the diisocyanate in an excess of 3% over and above the amount required for complete reaction of the reactants, so that the ratio of the number of hydroxyl groups used to the number of isocyanate groups in the reaction mixture is 1.03–1.3, preferably 1.05–1.15. The excess of NCO is then reacted stoichiometrically with the NH groups of the aminoalcohol, so that the ratio of the components (A-C):D:E is from 1:1.03–1.3:0.03–0.3, preferably 1:1.05–1.15:0.05–0.15.

The thermoplastic, resilient OH-containing polyurethanes having this composition are prepared in solution by the two-stage process, in the presence or absence of a catalyst and other assistants and/or additives. These products cannot be prepared by the solvent-free batch process. Because the presence of the triol and the reaction of the amine with NCO groups result in partial or complete formation of gel particles during polyaddition in the absence of a solvent, the reaction is carried out in solution. In general, the danger of local excessive crosslinking, as encountered in polyaddition in the absence of a solvent, is avoided in the case of polyaddition in solution.

In the 2-stage process, two different procedures are possible, depending on the reaction conditions (amount of solvent, heat of reaction).

Procedure 1: The diisocyanate is initially taken together with a little solvent, after which components A, B, C and, if required, the catalyst and the assistants and additives in solvents are added at from 20° to 90° C., preferably from 30° to 70° C., in the course of from 0.2 to 5 hours. The components are reacted until the desired NCO content is obtained, after which component E is added in the second stage.

Procedure 2: In this process, all starting components A to D are dissolved in some of the solvent to give solutions having a solids content of from 15 to 50% by weight. The stirred solutions are then heated to 20°–90° C., preferably 30°–70° C., if necessary after the addition of a catalyst. The components are then reacted until the desired NCO content is obtained, after which component E is added in the second stage.

In the 2-stage process, the first stage is carried out using an excess of NCO over components A to C. In both procedures, it is possible to begin the reaction in some of the solvent and to add the remaining solvent during or after the reaction.

The solvents used for the preparation of the polyurethanes are preferably cyclic ethers, such as tetrahydrofuran and dioxane, and cyclic ketones, such as cyclohexanone. Depending on the field of use, the polyurethanes can of course be dissolved in other strongly polar solvents, such as dimethylformamide, N-methylpyrrolidone, dimethyl sulfoxide or ethylglycol acetate. It is also possible to mix the stated solvents with aromatics, such as toluene or xylene, and esters, such as ethyl or butyl acetate.

Examples of suitable catalysts for the preparation of polyurethanes and for the crosslinking reaction are tertiary amines, such as triethylamine, triethylenediamine, N-methylpyridine and N-methylmorpholine, metal salts, such as tin octoate, lead octoate and zinc stearate, and organometallic compounds, such as dibutyltin laurate. The amount of catalyst which is suitable depends on the efficiency of the relevant catalyst. In general, it has proven advantageous to use from 0.005 to 0.3, preferably from 0.01 to 0.1, part by weight per 100 parts by weight of polyurethane.

The polyurethanes used according to the invention can be employed as the sole binder for the production of magnetic layers; however, for special applications in the case of magnetic recording media, it may be advantageous to add a second binder component in amounts of from 5 up to 50, preferably from 10 to 40, parts by weight, based on the resulting total amount of binder. The physically drying binders contained in the binder mixture with the stated special polyurethanes are known. They are polyvinylformal binders which were prepared by hydrolysis of a polymer of a vinyl ester followed by reaction of the vinyl alcohol polymer with formaldehyde. The polyvinylformals advantageously contain not less than 65, in particular not less than 80, % by weight of vinylformal groups. Suitable polyvinylformals contain from 5 to 13, % by weight of vinyl alcohol groups and from 80 to 88% by weight of vinylformal groups and have a specific gravity of about 1.2, a viscosity of from 50 to 120 cP, measured at 20°C. on a solution of 5 g of polyvinylformal in 100 ml of 1:1 phenol/toluene, and a Fikentscher J[K value of from 40 to 70 (1% strength in dimethylformamide). In addition to the polyvinylformal, vinyl chloride/diol mono- or di(meth)acrylate copolymers, which can be prepared, for example, in a conventional manner by solution copolymerization or suspension copolymerization of vinyl chloride and the diol monomethacrylate or monoacrylate, are also suitable. The diol mono- or diacrylate or -methacrylate used for this purpose is an esterification product of acrylic acid or methacrylic acid with the corresponding molar amount of an aliphatic diol of 2 to 4 carbon atoms, such as ethylene glycol, butane-1,4-diol or, preferably, propanediol, the propanediol preferably consisting of propane 1,3-diol and from 0 to 50% by weight of propane-1,2-diol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal parts by volume of tetrahydrofuran and dioxane has a viscosity of about 30 cP at 25°. The K value (according to H. Fikentscher, Cellulosechemie 3 (1931), page 58 et seq.) of the particularly suitable products is from 30 to 50, preferably about 40 (1% strength in dimethylformamide). It is also possible to use phenoxy resins of the formula

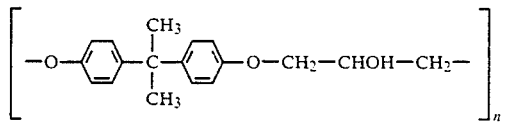

where n is roughly 100. These are polymers as described in, for example, DE-B 1 295 011. Cellulose ester binders are also suitable for the stated binder mixture. These are esterification products of cellulose with carboxylic acids of 1 to 4 carbon atoms, eg. cellulose acetate, cellulose triacetate, cellulose acetopropionate or cellulose acetobutyrate.

The special branched polyurethanes possessing the OH-containing urea groups at the chain ends, if appropriate as a mixture with other binders, are processed together with the magnetic material and the conventional assistants in a conventional manner to give the novel recording media.

Suitable anisotropic magnetic materials are the conventional pigments which substantially influence the properties of the resulting magentic layers, eg. gamma-iron(III) oxide, finely divided magnetite, ferromagnetic undoped or doped chromium dioxide or cobalt-modified gamma-iron(III) oxide. Acicular gamma-iron(III) oxide and ferromagnetic chromium dioxide are preferred. The particle size is in general from 0.2 to 2 μm, preferably from 0.3 to 0.8 μm.

The magnetic layers furthermore contain small amounts of additives such as dispersants and/or lubricants, as well as fillers, which are admixed during dispersing of the magnetic material or during production of the magnetic layer. Examples of such additives are fatty acids or isomerized fatty acids, such as stearic acid, or its salts with metals of the first to fourth main groups of the Periodic Table of Elements, amphoteric electrolytes, such as lecithin, and fatty acid esters or waxes, silicone oils, carbon black, etc. The amount of the additives is the usual amount and is in general less than 10% by weight, based on the magnetic layer.

The ratio of magnetic material to binder in the novel recording materials is from 1 to 10, in particular from 3 to 6, parts by weight of magnetic material per part by weight of the binder mixture. A particular advantage is that, owing to the excellent pigment-binding capacity of the special polyurethanes, high concentrations of magnetic material are possible in the magnetic layers without the resilience being adversely affected or the performance characteristics suffering markedly.

Suitable nonmagnetic and nonmagnetizable bases are the conventional rigid or flexible bases, in particular films of linear polyesters, such as polyethylene terephthalate, generally from 4 to 200 μm, in particular from 6 to 36 μm, thick. Recently, the use of magnetic layers on paper bases for electronic computing and accounting machines has also become important; for this purpose too, the novel coating materials can be advantageously used.

The novel magnetic recording media can be produced in a conventional manner. Advantageously, the magnetic pigment dispersion prepared in a dispersing apparatus, for example a tubular ball mill or a stirred mill, from the magnetic material and a solution of the binder with the addition of dispersants and other additives is, if required, mixed with the polyisocyanate crosslinking agent, and the mixture is then filtered and applied to the nonmagnetic base using a conventional coating apparatus, for example a knife coater. As a rule, magnetic alignment is effected before the liquid coating mixture is dried on the base; drying is advantageously effected in the course of from 2 to 5 minutes at from 50° to 90° C. The magnetic layers can be calendered and compacted on conventional apparatuses by passing them between heated and polished rolls, if necessary under pressure and at from 25° to 100° C., preferably from 60° to 80° C.

During crosslinking of the binders, which may or may not be additionally carried out, it has proven very advantageous to effect calendering before the crosslinking is complete, since the OH-containing polymers in the uncrosslinked state are very thermoplastic without sticking. The thickness of the magnetic layer is in general from 0.5 to 20 μm, preferably from 1 to 10 μm. For the production of magnetic tapes, the coated films are slit in the longitudinal direction into the conventional widths generally specified in inches.

The novel magnetic recording media have improved adhesion and peel strength compared with those produced using the prior art polyurethanes or polyurethane mixtures with suitable harder coating resin components as binders. The fact that, with the OH-containing polyurethane, the known magnetic materials can be processed readily and in particular in a very short time and with very little energy consumption in a conventional dispersing apparatus to give homogeneous, highly pigmented dispersions is also important. Furthermore, magnetic-ally and hence electroacoustically improved magnetic recording media can be obtained in a simplified and shortened procedure using the OH-containing polyurethane binder crosslinked with polyisocyanate. Another advantage is that, as a result of a crosslinking, the polymers suitable for the novel magnetic recording media give magnetic layers which are also stable at high temperature and humidity.

In the Examples and Comparative Experiments below, parts and percentages are by weight, unless stated otherwise. Parts by volume bear the same relation to parts by weight as that of the liter to the kilogram.

The adhesion of the magnetic layer was determined according to ECMA Standard No. 120, Point 5.11, page 6. In measuring the peel strength, a tape is drawn, on the film side, at a defined angle over a sharp-edged blade. The tape tension, which is measured constantly, is increased continuously until the time when the layer peels off (over the blade). The tape tension at the time when the layer peels off is a measure of the peel strength.

EXAMPLE 1

(a) 6,600 parts of a polycarbonate (molecular weight about 2,000), 584 parts of hexane-1,6-diol, 74 parts of trimethylolpropane, 2,607 parts of oxyethylated 2,2-bis(4-hydroxyphenyl)propane, 3,465 parts of 4,4'-diphenylmethane diisocyanate and 775 parts of toluylene diisocyanate are dissolved in 32,911 parts of tetrahydrofuran and heated to about 55° C. in a heatable reaction vessel having a capacity of 150,000 parts by volume and equipped with a stirrer and a reflux condenser. The components are reacted to a final viscosity of 20 Pa.s (at 60° C.), and the mixture is then diluted with 23,509 parts of tetrahydrofuran to a solids content of 20%. The NCO content is 0.1%. At the same time, the reaction is stopped by adding 238 parts of diethanolamine. The K value of the resulting polymer is 63, measured on a 1% strength solution in dimethylformamide. The OH number is 12.

(b) 100,000 parts of steel balls, 16,000 parts of the polyurethane elastomer solution stated under a) and diluted to 12.5%, 10,000 parts of a 10% strength solution of a polyvinylformal, consisting of 82% of vinylformal units, 12% of vinyl acetate units and 6% of vinyl alcohol units and having a K value of 50 (1% strength in dimethylformamide), 67.5 parts of N-tallowfatty-1,3-diaminodioleate, 270 parts of zinc stearate and 13,500 parts of a ferromagnetic chromium dioxide pigment having a mean particle size of 0.5 μm and a length/width ratio of from 4:1 to 9:1 and 4,500 parts of tetrahydrofuran are introduced into a steel ball mill having a capacity of 100,00 parts by volume and operated at about 40 rpm, and are dispersed in the course of 120 hours. The magnetic dispersion is then filtered under pressure through a filter having a pore diameter of 5 μm. A 20 μm thick polyethylene terephthalate film is coated with the magnetic dispersion by a conventional technique using a knife coater, and, after passing through a magnetic field, the coating is dried at from 60° to 100° C. The magnetic layer is compacted and calendered by passing it between heated rolls (70° C.) under pressure. The resulting thickness is 5 μm. The coated film is then slit into 3.81 mm wide tapes. The results of the measurements are shown in Table 1.

COMPARATIVE EXPERIMENT 1

The composition and production are as described in Example 1, with the exception that, instead of the terminating agent diethanolamine, the corresponding molar amount of dibutylamine is used. The results of the measurements are shown in Table 1.

diisocyanate are dissolved in 460,343 parts of tetrahydrofuran and heated to about 55° C. in a heatable reaction vessel having a capacity of 150,000 parts by volume and equipped with a stirrer and a reflux condenser. The components are reacted to a final viscosity of 20 Pa.s (at 60° C.), and the mixture is then diluted with 34,571 parts of tetrahydrofuran to a solids content of 12.5%. The NCO content is 0.06%. At the same time, the reaction is stopped by adding 100 parts of diethanolamine. The K value of the resulting polymer is 63, measured on a 1% strength solution in dimethylformamide. The OH number is 12.

(b) 900 g of a ferromagnetic chromium dioxide pigment having a mean particle size of 0.5 μm, a length/width ratio of from 4:1 to 9:1, a coercive force of 40.0 kA/m and a specific surface area of 20 m²/g, together with 30.3 g of a 12.5% strength solution of the novel polyurethane elastomer, 81 g of a 20% strength solution of a polyvinylformal, consisting of 82% of vinylformal units, 12% of vinyl acetate units and 6% of vinyl alcohol units, 13.5 g of zinc stearate, 4.5 g of stearylamide, 4.5 g of N-tallowfatty-1,3-diaminodioleate and 913 g of a mixture of equal amounts of tetrahydrofuran and dioxane, were introduced into a steel ball mill having a capacity of 6 l and contaning 8 kg of steel balls of 4–6 mm diameter, and were dispersed in the course of about 72 hours. In the subsequent phase, a further 818 g of the novel polyurethane elastomer solution and 219 g of the polyvinylformal solution were then added and dispersing was continued for a further 24 hours. Thereafter, the dispersion was removed from the mill and filtered under pressure through a filter having a pore diameter of 5 μm. After the filtration, 17 g of a 50% strength solution of a triisocyanate obtained from 3 moles of toluylene diisocyanate and 1 mole of trimethylolpropane were added per kg of dispersion, with vigorous stirring. The dispersion was then applied to a 23 μm thick polyethylene terephthalate film by means of a conventional knife coater. The coated film is passed through a magnetic field to align the magnetic particles and then dried at from 50° to 90° C. After drying, the magnetic layer is compacted and calendered by passing it between heated rolls, so that the thickness of the magnetic layer is 4 μm. The coated film is slit into 12.65 mm wide tapes for computer applications.

The results of the adhesion measurements are summarized in Table 2.

COMPARATIVE EXPERIMENT 2

The procedure described in Example 2 is followed, except that, instead of the polyurethane elastomer containing diethanolamine as a terminating agent, an elastomer of the same composition and containing the corresponding amount of dibutylamine as a terminating agent was used. The results of the measurements are shown in Table 2.

TABLE 1

| | Example 1 | | | | Comparative Experiment 1 | | | |
|---|---|---|---|---|---|---|---|---|
| | Adhesion | | Peel strength | | Adhesion | | Peel strength | |
| Storage time | 23° C./ 50% rel. h. | 40° C./ 93% rel. h. | 23° C./ 50% rel. h. | 40° C./ 93% rel. h. | 23° C./ 50% rel. h. | 40° C./ 93% rel. h. | 23° C./ 50% rel. h | 40° C./ 93% rel. h |
| 1 week | 24 cN | 24 cN | 400 cN | 260 cN | 24 cN | 20 cN | 350 cN | 140 cN |
| 2 weeks | 24 cN | 23 cN | 400 cN | 230 cN | 23 cN | 16 cN | 280 cN | 100 cN |
| 3 weeks | 23 cN | 23 cN | 400 cN | 240 cN | 24 cN | 13 cN | 250 cN | 40 cN |
| 4 weeks | 24 cN | 22 cN | 400 cN | 230 cN | 23 cN | 13 cN | 200 cN | 80 cN |

EXAMPLE 2

(a) 6,600 parts of a polyesterdiol obtained from adipic acid and butane-1,4-diol (molecular weight about 1,000), 778 parts of butane-1,4-diol, 42 parts of trimethylolpropane and 4,046 parts of 4,4'-diphenylmethane

TABLE 2

| Storage time | Example 2 Adhesion at | | Comparative Experiment 2 Adhesion at | |
|---|---|---|---|---|
| | 23° C. 5% rel. h. | 40° C. 93% rel. h. | 23° C. 50% rel. h | 40° C. 93% rel. h. |
| 1 week | 3.4 N | 3.2 N | 1.5 N | 1.6 N |
| 2 weeks | 3.1 N | 2.8 N | 1.4 N | 1.2 N |
| 3 weeks | 2.9 N | 2.7 N | 1.4 N | 1.2 N |
| 4 weeks | 3.0 N | 2.9 N | 1.4 N | 1.2 N |

We claim:

1. A magnetic recording medium consisting of a nonmagnetic base and, firmly applied to this, at least one magnetic layer based on a magnetic material finely dispersed in a binder consisting of not less than 50% by weight of a thermoplastic polyurethane, wherein the thermoplastic polyurethane used is a branched polyurethane which is soluble in tetrahydrofuran and free of isocyanate groups, possesses OH-containing urea groups at the chain ends and has a molecular weight of from 40,000 to 200,000, and which is prepared from A. 1 mole of a polydiol having a molecular weight of from 400 to 4,000, B. from 0.3 to 10 moles of a straight-chain aliphatic diol of 2 to 10 carbon atoms, C. from 0.05 to 0.5 mole of a tri- or polyol of 3 to 10 carbon atoms, D. from 1.3 to 13 moles of a diisocyanate of 6 to 30 carbon atoms and E. from 0.09 to 2 moles of an aminoalcohol of 2 to 16 carbon atoms, with the proviso that the ratio of the OH groups of components A to C to the NCO groups of component D to the amine groups of component E is 1:1.03–1.3:0.03–0.3.

2. A magnetic recording medium as defined in claim 1, wherein the branched polyurethane which is soluble in tetrahydrofuran and free of isocyanate groups, possesses OH-containing urea groups at the chain ends and has a molecular weight of 40,000 to 200,000 is crosslinked with an isocyanate from the group consisting of the di-, tri- and polyisocyanates and the isocyanate prepolymers having a molecular weight of up to 10,000.

3. A magnetic recording medium as defined in claim 1, which contains the stated polyurethane as the sole binder.

4. A magnetic recording medium as defined in claim 2, which contains the stated polyurethane as the sole binder.

5. A magnetic recording medium as defined in claim 1, wherein component E is an amino alcohol of 3 to 6 carbon atoms.

6. A magnetic recording medium as defined in claim 1, wherein component E is diethanolamine or diisopropanoldiamine.

* * * * *